(No Model.)

F. ARMSTRONG.
CHAIN LINK OR COUPLER.

No. 370,918.  Patented Oct. 4, 1887.

WITNESSES
Phil C. Dietrich
Everett Ellis

Frank Armstrong
INVENTOR
By
Wm. O. W. Intire, Attorney

UNITED STATES PATENT OFFICE.

FRANK ARMSTRONG, OF BRIDGEPORT, CONNECTICUT.

CHAIN LINK OR COUPLER.

SPECIFICATION forming part of Letters Patent No. 370,918, dated October 4, 1887.

Application filed March 2, 1887. Serial No. 229,408. (No model.)

*To all whom it may concern:*

Be it known that I, FRANK ARMSTRONG, a citizen of the United States, residing at Bridgeport, county of Fairfield, Connecticut, have invented new and useful Improvements in Chain Links or Couplers, of which the following is a specification.

This invention relates to certain new and useful improvements in chain links or couplers; and it consists, substantially, in the same as constructed, and in such peculiar arrangement and combinations of parts, as will hereinafter be more particularly described, and pointed out in the claims.

The object of the invention is to provide a simplified and effective automatic detachable link for connecting or coupling together the two ends of a chain, or for repairing broken chains, or for taking up the length of a chain, also other similar purposes, all as will more fully appear from the description hereinafter following, when taken in connection with the accompanying drawings, wherein—

Figure 1:
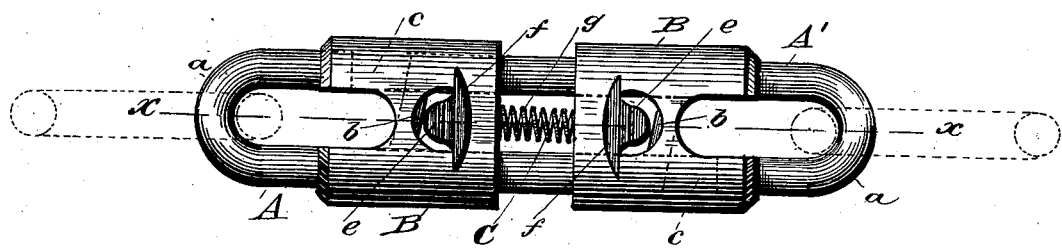
Figure 2:
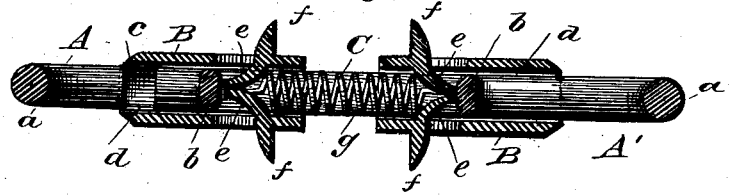
Figure 3:
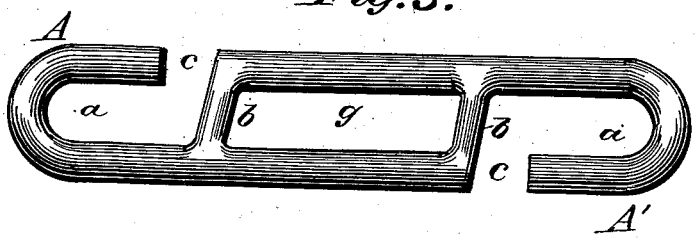
Figure 4:
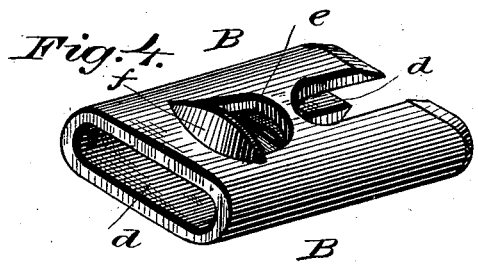

Figure 1 is a longitudinal side elevation of chain-link embodying my improvements, and Fig. 2 is a longitudinal sectional view thereof on the line $x\,x$. Fig. 3 is a view in detail of the double shank and hooks, and Fig. 4 is a view in perspective of one of the movable sleeves operating on the double shank.

Before proceeding with a more full description of the construction and operation of my invention, I desire to state that I am aware that chain-links have been heretofore invented for purposes analogous to the present; but, so far as I am aware, the constructions and arrangements of parts herein resorted to are thought to be substantially different from anything heretofore devised.

Reference being had to the several parts by the letters marked thereon, A and A' each represent a shank having at one end a hook, $a$, the opposite ends of such shanks being united integrally by connecting portions or ribs $b\,b$ in such manner as to leave a space, $c\,c$, for the insertion of an ordinary chain-link and to bring the hooks $a\,a$ reversely to each other.

Surrounding the two shanks A and A', which I shall hereinafter refer to conjointly as the "double shank," are two counterpart movable sleeves, B B, which are each slotted or hollowed out, as at $d$, so as to admit of the necessary free play of the chain-links when they are attached or connected, the said sleeves being also formed with lugs $e\,e$, which, after the sleeves have been slipped on, are bent or turned inwardly behind the connecting portions $b\,b$ of the double shank thus preventing the sleeves from slipping off. To opposite sides of the sleeves outer projecting ears or lugs, $f\,f$, are formed or cast, the same being for the purpose of readily permitting the sleeves to be pushed or forced inwardly by pressure exerted by the hand or fingers.

Located in the space $g$ of the double shank intermediate of the connecting-ribs $b\,b$ is a spring, C, which enters the sleeves B B from their inner ends and bears against the inner projecting lugs, $e\,e$, thereof, thus exerting by its tension a pressure to always maintain the sleeves out far enough to cover the spaces $c\,c$, through which the chain-links are inserted in making a connection or attachment.

From the foregoing description it will be seen that when it is desired to connect the two ends of a chain, or repair a broken one, all that is necessary to do is to simply slip or force the sleeves B B backward against the tension of the spring C until the spaces $c\,c$ are disclosed, and then slip the links through such spaces behind the hooks $a\,a$ and allow the spring of its own resiliency to force or push the sleeves outward to again inclose the spaces, thereby completing and effecting a secure and quick fastening or repair.

It should be remarked that the present invention is applicable to many other uses—such, for instance, as a tug attachment to singletree-clips, and for other similar fastenings.

Having thus described my invention, what I claim as new, and desire to secure by Letters Patent, is—

1. In chain-links, the combination of the double shank having reversely-formed hooks, sleeves embracing and movable thereon, and a spring located between the sleeves tending to force them outwardly, substantially as described.

2. In chain-links, the combination of the double shank having reversely-formed hooks

*a a* and connecting-ribs *b b*, the sleeves movable thereon, and formed with inner lugs, *e e*, and outer lugs, *f f*, and a spring entering the sleeves and bearing against the inner lugs thereof, substantially as shown, and for the purpose described.

In testimony whereof I have hereunto set my hand in the presence of two subscribing witnesses.

FRANK ARMSTRONG.

Witnesses:
 FRANK T. STAPLES,
 I. C. FOWLER.